May 25, 1926.

M. BELLO

MANUFACTURE OF CONTAINERS

Filed Dec. 10, 1924

1,585,642

3 Sheets-Sheet 2

Inventor:
Marino Bello,
By Dyrenforth Lee, Chritton & Wiles,
Attys.

May 25, 1926.

M. BELLO

MANUFACTURE OF CONTAINERS

Filed Dec. 10, 1924　　3 Sheets-Sheet 3

1,585,642

Inventor:
Marino Bello,

Patented May 25, 1926.

1,585,642

UNITED STATES PATENT OFFICE.

MARINO BELLO, OF HIGHLAND PARK, ILLINOIS, ASSIGNOR TO BELLO BYFIELD CORPORATION, OF WAUKEGAN, ILLINOIS, A CORPORATION OF ILLINOIS.

MANUFACTURE OF CONTAINERS.

Application filed December 10, 1924. Serial No. 754,971.

My invention relates to the manufacture of containers such as, for example, are provided to receive the battery elements of storage batteries and form containers therefor and for the electrolytes. The invention has particular reference to the manufacture of containers which are molded about a core structure and which are formed of material, as for example rubber compound, required to be vulcanized to render the container durable.

My primary objects are to reduce the cost of manufacture of containers, especially battery containers, formed of vulcanizable material; and to provide a machine which shall be of simple and economical construction and by the use of which the cost of manufacturing containers will be materially reduced.

Referring to the accompanying drawings:—

Figure 1:
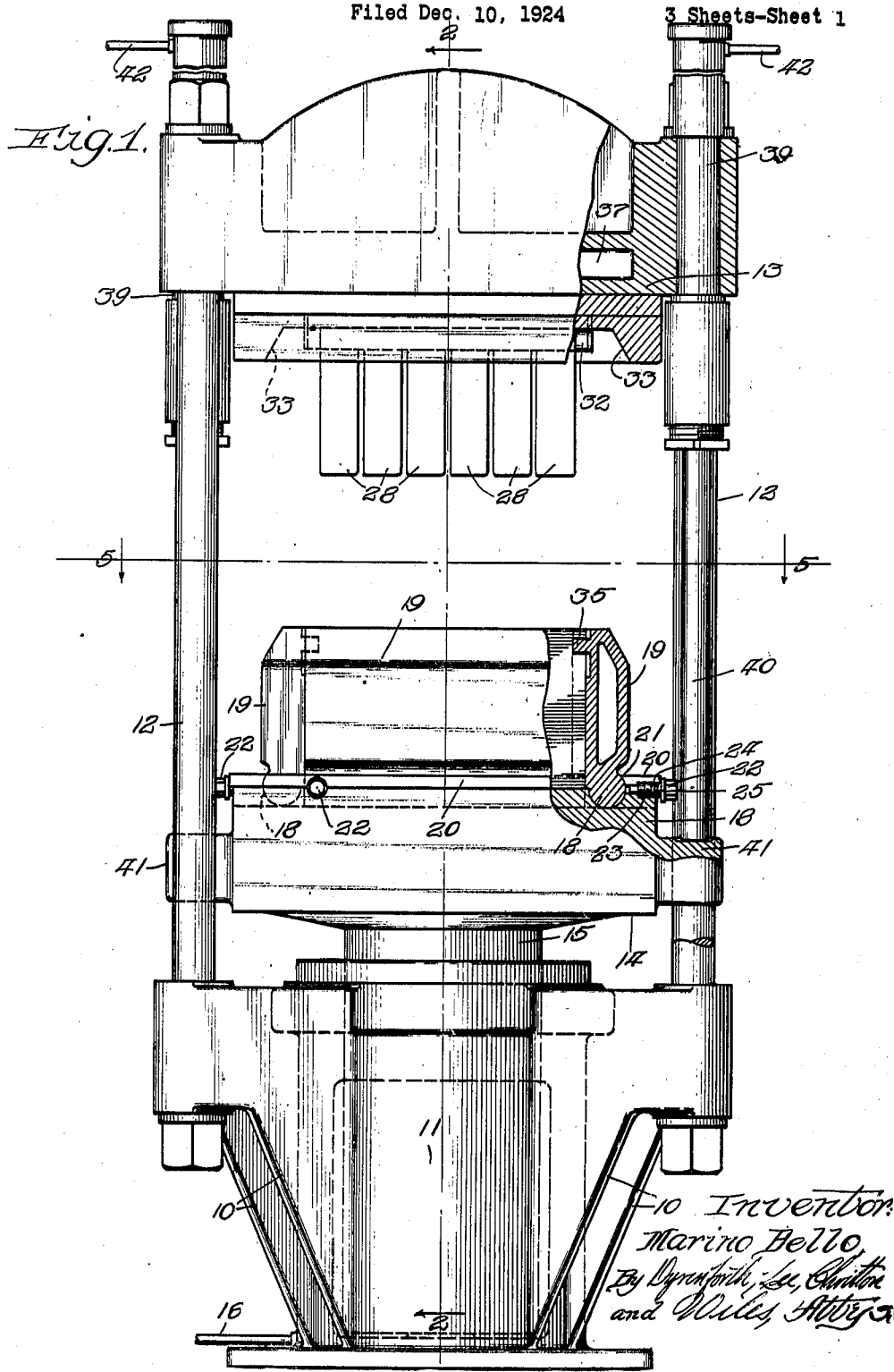
Figure 2:
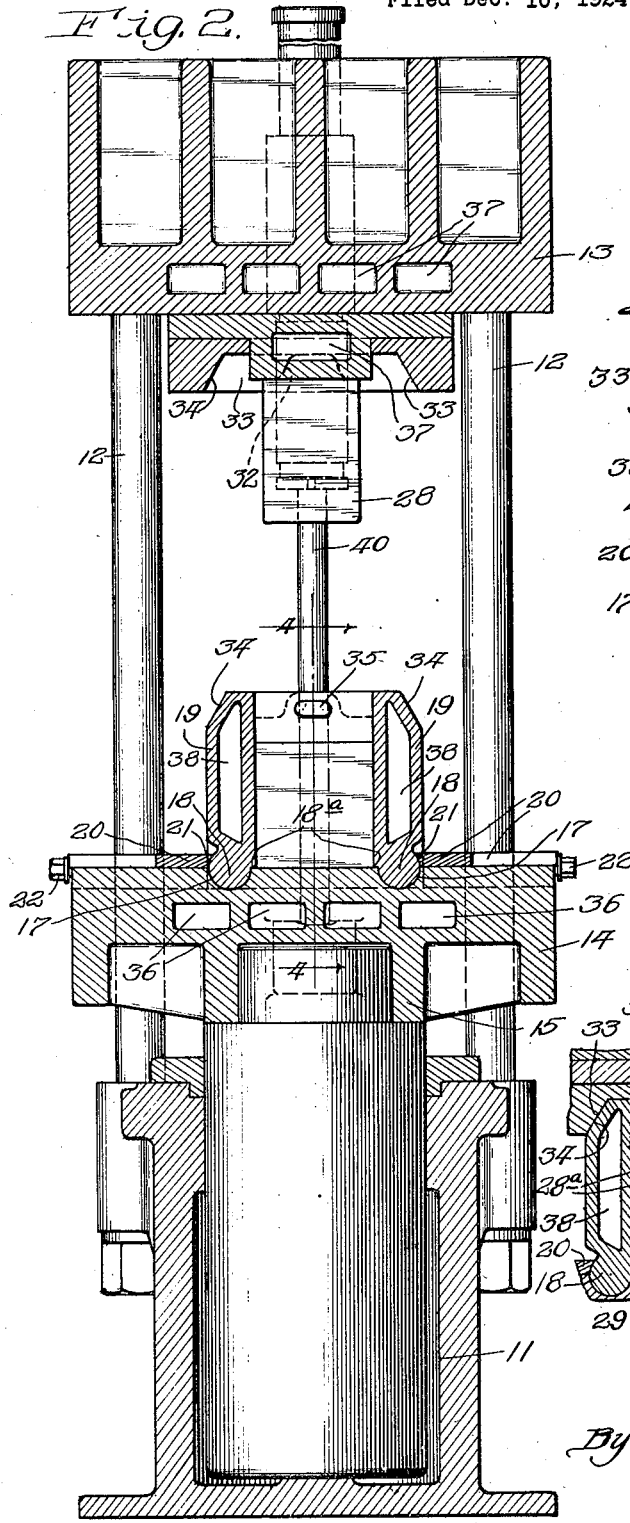
Figure 3:
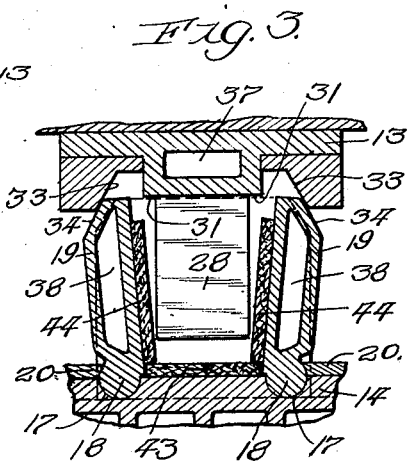
Figure 4:
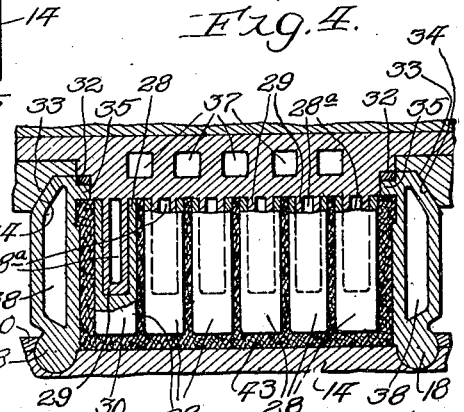
Figure 5:
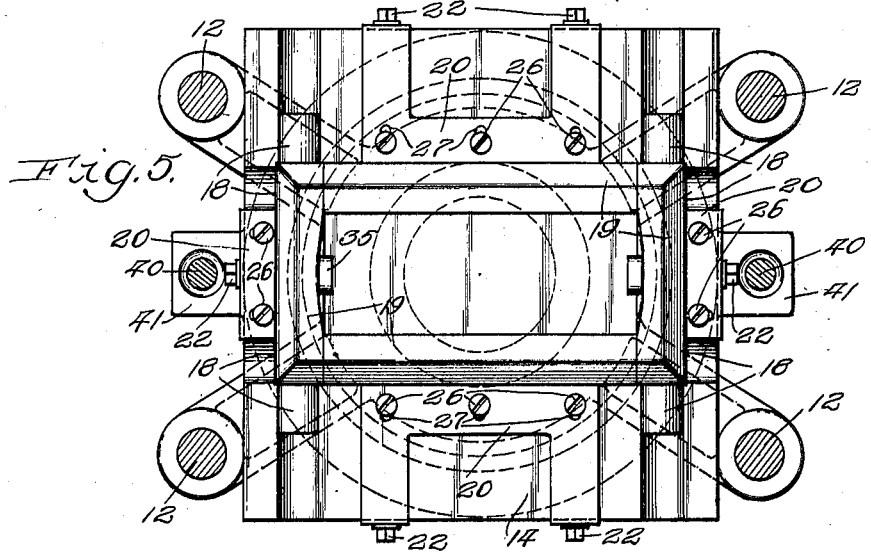

Figure 1 is a view in elevation, with certain parts sectioned and broken away, of a machine constructed in accordance with my invention. Figure 2 is a section taken at the line 2—2 on Fig. 1 and viewed in the direction of the arrows. Figure 3 is a sectional view of a detail of the machine showing the side and bottom-forming portions of the mold in one of the positions occupied by them in the operation of the machine for forming a container, the position shown of these parts being that occupied by them immediately preceding the final positioning thereof for forming the container. Figure 4 is a broken section taken at the line 4—4 on Fig. 2 and viewed in the direction of the arrows, showing the side and bottom portions of the mold in the final positioning thereof in the container-forming operation, with the container shown molded therein. Figure 5 is a plan sectional view taken at the line 5—5 on Fig. 1 and viewed in the direction of the arrows; and Fig. 6, a broken view in sectional elevation of a modification of the machine of the preceding figures.

Referring to the particular, illustrated, embodiment of my invention, the machine comprises a base 10 presenting an upwardly opening cylinder 11, upwardly extending rods 12 disposed in rectangular arrangement and rising from the base 10, and a head 13 surmounting, and rigidly connected, with the rods 12, to extend in space relation to the base 10.

The machine also comprises a vertically movable member 14 provided with a depending piston-portion 15 which extends guidingly into the cylinder 11 and is adapted to be forced upwardly therein in any suitable way, as for example by fluid pressure introduced into the bottom of the cylinder 11 through a pipe 16. The member 14 is provided with upwardly-opening, semi-cylindrical, grooves 17 disposed in a rectangular arrangement and into which the lower, cylindrical-shaped, edge-portions 18 of plates 19 constituting the side-wall-forming portions of the mold in which the container is formed, are seated to rock therein, the inner surfaces of the plates 19, adjacent their cylindrical portions 18, presenting shoulders 18$^a$ which form stops preventing the swinging of the plates 19 inwardly at their upper ends beyond the positions shown in Figs. 1, 2 and 4. Means are provided for preventing displacement of the portions 18 of the plates 19 in the grooves 17, these means in the particular arrangement shown, comprising yoke-plates 20, superposed on the member 14 with their inner edges shaped, as represented at 21, to conformingly overlap the cylindrical portions 18 of the plates 19, the plates 20 being adjustable toward and away from each other by means of adjusting screws 22 located between the member 14 and the plates 20 and extending into grooves 23 and 24, respectively, therein, the grooves 23 being threaded and the headed ends 25 of these screws engaging the outer edges of the plates 20, which latter are held in adjusted position by screws 26 which extend through elongated slots 27 in the plates 20 and screw into the member 14. The cylindrical portions 18 are so shaped, as shown, as to abut against the stop-edges 21 of the plates 20 when the mold-plates 19 are swung outwardly to a certain position, namely, that shown in Fig. 3.

It may here be stated that the plates 19 form the side walls of the mold and that portion of the member 14 which is bounded by the grooves 17 forms the bottom of the mold in which the container is formed.

The head 13 carries the depending core-portion of the mold, which, in the particular construction shown, comprises six core sections 28 for forming a container presenting six compartments, these core sections being spaced apart as shown. Each core section is shown as formed of a depending bar-like portion 29 and a socketed portion 30 telescoped with the portion 29 and rigidly secured thereto in any desired manner.

The head 13 is provided with horizontal downwardly-facing surfaces 31 which surround the core sections adjacent their upper end portions and which form the portions of the mold structure which determine the height of the side walls of the formed container, and with downwardly opening recesses 32 located at opposite ends of the core sections and extending above the surfaces 31, as shown, these recesses forming those portions of the mold-cavity in which the handle-portions of the container at its end-walls are formed.

The head is provided at all four sides of the core structure described and outwardly therebeyond, with inclined camming surfaces 33 for cooperation with the mold-plates 19, to force the latter, in the upward movement of the head 14 to the position shown in Fig. 4, inwardly to the position shown in this figure, for the purpose hereinafter described, the upper edges of the plates 19 being preferably chamfered, as represented at 34, to provide the upwardly and inwardly inclined beveled surfaces shown which ride against the surfaces 33 and forcibly swing the plates 19 inwardly to the position shown in Fig. 4.

The handle-portions of the containers are, by preference, provided with finger holes which are formed by lugs 35 provided on the end-wall-forming ones of the plates 19.

The machine shown is adapted not only for the molding of a container of the desired shape, but also for the vulcanizing of the molded material, and to this end is so constructed that the various elements of the structure contacted by the material from which the container is to be formed, are subjected to the desired vulcanizing heat, the machine, to this end, containing steam passages 36, 37 and 38 in the member 14, head 13 and plates 19, respectively, and steam passages 28ª in the cores 28, all of which passages may in practice, be connected with any suitable source of steam supply as will be readily understood by those skilled in the art.

The machine shown is provided at opposite sides thereof with vertically disposed cylinders 39 mounted in the head 13 and containing vertically reciprocable pistons 40 which are disposed directly above lugs 41 provided on the member 14 and against which the pistons operate upon supplying fluid pressure to the upper ends of the cylinders 39, as through the pipes 42.

In the use of the machine, the member 14 is lowered to the position shown in Figs. 1 and 2 and the wall-forming-plates 19 swung outwardly at their hinge connections with the member 14 substantially to the position shown of the plates appearing in Fig. 3. The material from which the container is to be formed, which, by way of example, may be any suitable vulcanizable rubber compound capable of resisting the action of the acid used in storage batteries, and furnished in sheet form, is then introduced into the space presented between the plates 19 and the bottom-forming portion of the member 14, to flatwise oppose these surfaces, as represented of the sheets 43 and 44 in Fig. 3, the sheets adjacent the end-wall-forming plates 19 not being shown, but being provided of a form to generally correspond with the end walls of the formed container and encircling the lugs 35 at their upper ends; and sheets of the rubber compound of substantially the same shape, and substantially the same width and height as the core-portions 28, are introduced into the spaces between adjacent ones of these core-portions.

With the rubber compound sheets thus positioned, these sheets being preferably heated preliminary to their application to the mold structure as above stated, fluid pressure is introduced into the cylinder 11 which forces the member 14 and the parts carried thereby upwardly to the position shown in Fig. 4. As the member 14 nears the limit of its upward movement, the beveled surfaces of the plates 19 engage the camming surfaces 33 on the head 13 with the result of forcibly swinging the plates 19 inwardly to the position shown in Fig. 4. The sheets of vulcanizable material applied to the mold structure as above stated, are of such size that in the closing of the mold structure, as stated, this material is placed under high pressure and is forced into all portions of the mold to form a homogeneous integral mass in the form of the container desired to be produced.

By preference the portions of the mold structure contacted by the vulcanizable material, are preferably subjected to the heating action of steam supplied to the various steam passages referred to, before the molding operation just referred to, the furnishing of the heating medium to these parts, to heat them to a degree necessary for vulcanizing the contents of the mold, being continued, while the molded article is held under the molding pressure, until the material has been properly vulcanized.

Following the vulcanizing operation, the operator shuts off the flow of fluid pressure to the cylinder 11 and opens the supply of fluid pressure to the upper ends of the cylinders 39, whereupon the pistons 40 are forced downwardly against the member 14, with the result of stripping the molded container, represented at 43, from the core structure, whereupon the operator swings the plates 19 outwardly to release the container for removal from the machine.

Inasmuch as the plates 19, through the lugs 35, present portions which overlap portions of the container 43, the stripping of the container 43 from the core, rather than the stripping of the container from the portion of the mold structure carried by the member 14, is effected. However, it will be understood that, if desired, the plates 19 may be formed with other, additional, portions which overlap portions of the formed container and augment the action of the lugs 35 in the stripping action. Furthermore, where the container to be formed is not provided with apertures in handle portions thereof, as described, any suitable overlapping of the walls 19 relative to the formed container, to pull it from the core, may be provided.

Figure 6:
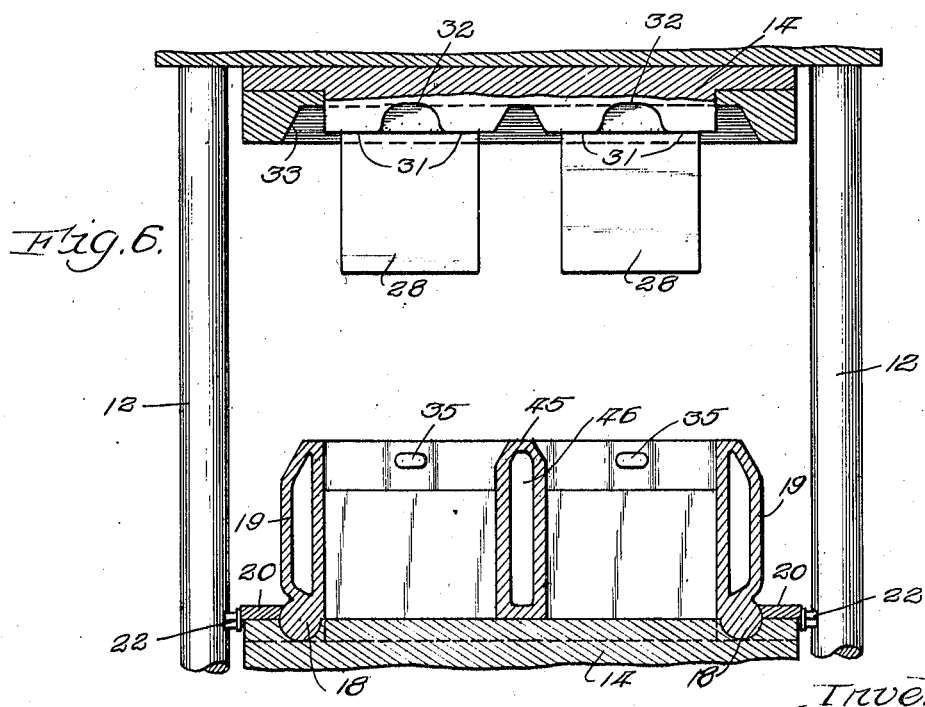

Referring now to the structure shown in Fig. 6, this is the same as that shown in the preceding figures, except that it is provided for the simultaneous forming of a plurality of the containers. To this end the core portions 28 are provided in separated sets, this figure showing the sets in end elevation, these sets cooperating with the lower mold sections for forming two plural-cell containers. Instead of forming all of the upright-wall-forming plates of the mold, as hingedly supported structures, as in the structure of the preceding figures, three wall-forming plates 19 for each mold-cavity are provided, and a single upright-wall forming plate portion for the remaining adjacent sides of these mold-cavities, this side-wall-forming plate portion being represented at 45, is rigidly secured to the member 14 midway between the two swinging side-wall-forming plates 19, it being understood this stationary plate portion 45 would also contain a steam passage represented at 46.

It will be readily understood from the foregoing that by providing a machine in accordance with my invention containers may be rapidly and economically produced, without requiring handling by the workmen during the molding and vulcanizing operations, and without danger of breakage.

While I have illustrated and described certain forms of machines in which my invention may be embodied, I do not wish to be understood as intending to limit it thereto as the same may be variously modified and altered, and the invention embodied in other forms, without departing from the spirit of my invention.

What I claim as new and desire to secure by Letters Patent, is:

1. In a molding machine, the combination of receptacle-forming mold and core members, said members being relatively movable into and out of a position in which said core extends into said mold-member, means comprising a portion extending in a direction crosswise of the molded receptacle and overlapping a portion of said receptacle, for stripping the molded receptacle from one of said members in the relative movement of said members away from each other, and means for continuously controlling the temperature of said overlapping portion.

2. In a molding machine, the combination of a stationary core-member, a receptacle-forming mold-member movable into and out of a position in which said core extends into said mold-member, means comprising a portion extending in a direction crosswise of the molded receptacle and overlapping a portion of the latter, for stripping the receptacle from the core member in the movement of said mold member away from said core member, and means for continuously controlling the temperature of said overlapping portion.

3. In a molding machine, the combination of receptacle-forming mold and core members, said members being relatively movable into and out of a position in which said core extends into said mold-member, means on said mold-member for stripping the molded receptacle from said core-member in the relative movement of said members away from each other, said means comprising a portion extending in a direction crosswise of the molded receptacle and overlapping a portion of the latter, and means for continuously controlling the temperature of said overlapping portion.

4. In a molding machine, the combination of a stationary core-member, a receptacle-forming mold-member movable into and out of a position in which said core extends into said mold member, means on said mold member for stripping the molded receptacle from the core-member in the movement of said mold member away from said core-member, said means comprising a portion extending in a direction crosswise of the molded receptacle and overlapping a portion of the latter, and means for continuously controlling the temperature of said overlapping portion.

5. In a molding machine, the combination of receptacle-forming mold and core members, said members being relatively movable into and out of a position in which said core extends into said mold-member, means comprising a portion on one of said members extending in a direction crosswise of the molded receptacle and overlapping a portion of the latter, for stripping the molded receptacle from the other of said members in the relative movement of said members away from each other, and means for continuously controlling the temperature of said overlapping portion.

6. In a molding machine, the combination of a stationary core-member, a receptacle-forming mold-member movable into and out of a position in which said core extends into said mold-member, means comprising a portion on said mold-member and extending in a direction crosswise of the molded receptacle and overlapping a portion of the latter, for stripping the receptacle from the core member in the movement of said mold member away from said core member, and means for continuously controlling the temperature of said overlapping portion.

7. In a machine of the character set forth, the combination of receptacle-forming mold and core members, the side-walls of said mold member being movable toward and away from each other and said members being relatively movable into and out of a position in which said core extends into said mold member, said side-walls having portions which overlap portions of the molded receptacle and produce stripping of the receptacle relative to the core-member in the relative movement of said members away from each other, and means for continuously controlling the temperature of said overlapping portion.

8. In a machine of the character set forth, the combination of receptacle-forming mold and core members, the side walls of said mold member being rockably supported to be movable toward and away from each other and said members being relatively movable into and out of a position in which said core extends into said mold member, said side walls having portions which overlap portions of the molded receptacle and produce stripping of the receptacle relative to the core member in the relative movement of said members away from each other, and means for continuously controlling the temperature of said overlapping portion.

9. In a machine of the character set forth, the combination of a stationary core-member, a mold member movable into and out of a position in which said core extends into said mold member, side-walls of said mold member being movable toward and away from each other, said side-walls having portions which overlap portions of the molded receptacle and produce stripping of the receptacle from the core in the movement of said mold member away from said core member, and means for continuously regulating the temperature of said overlapping portions.

10. In a machine of the character set forth, the combination of receptacle-forming mold and core members, side-walls of said mold member being movable toward and away from each other and said members being relatively movable into and out of a position in which said core extends into said mold member, and means operating in the relative movement of said members toward each other to force said walls toward each other, said side-walls having portions which overlap portions of the molded receptacle and produce stripping of the receptacle relative to the core-member in the relative movement of said members away from each other, and means for continuously regulating the temperature of said overlapping portions.

11. In a machine of the character set forth, the combination of a stationary core-member, a mold member movable into and out of a position in which said core extends into said mold member, side-walls of said mold member being movable toward and away from each other, and means operating in the movement of said mold member toward said core-member to force said walls toward each other, said side-walls having portions which overlap portions of the molded receptacle and produce stripping of the receptacle from the core in the movement of said mold member away from said core member, and means for continuously regulating the temperature of said overlapping portions.

12. In a machine of the character set forth, the combination of receptacle-forming mold and core members, side-walls of said mold member being movable toward and away from each other and said members being relatively movable into and out of a position in which said core extends into said mold member, and means operating in the relative movement of said members toward each other to force said walls toward each other, the parts being so formed as to provide handle-portions of the moldable material on the end-walls of the receptacle, certain of said walls having bosses at which openings in said handle-portions are formed, and so disposed as to strip the formed receptacle from the core.

13. In a machine of the character set forth, the combination of a member presenting the bottom wall of a mold, side-wall forming plates certain of which are hingedly connected with said member, bosses extending inwardly from certain of said plates adjacent their free ends, for the purpose set forth, and means for continuously regulating the temperature of said bosses.

14. In a molding machine, the combination of receptacle-forming mold and core members, said members being relatively movable into and out of a position in which said core extends into said mold-member, means for causing relative movement of said members to a position in which the core extends into said mold-member, means for causing relative movement of said member out of said position, means, comprising a portion extending in a direction crosswise of the molded receptacle and overlapping a portion thereof, for stripping the molded receptacle from one of said members in the relative movement of said members away from each other, and means for continuously regulating the temperature of said overlapping portion.

15. A mold-structure comprising a container-bottom-forming portion, container-side-wall-forming portions hingedly connected therewith to swing toward and away from each other, means carried by said side wall forming portions overlapping a portion of the molded article, and means for continuously regulating the temperature of said overlapping means.

16. A mold-structure comprising a container-bottom-forming portion containing grooves, container-side-wall-forming portions rockingly seated in said grooves to swing toward and away from each other, means carried by said side wall forming portions overlapping a portion of the molded article, and means for continuously regulating the temperature of said overlapping means.

17. A mold-structure comprising a container-bottom-forming portion containing grooves of circular shape in cross-section and container-side-wall-forming portions having cylindrical portions rockingly seated in said grooves to swing toward and away from each other, means for preventing displacement of said wall-forming portions in said grooves, means carried by said side wall forming portions overlapping a portion of the molded article, and means for continuously regulating the temperature of said overlapping means.

18. In a machine of the character set forth, the combination of a receptacle-forming mold and core members, side-walls of said mold member being movable toward and away from each other and said members being relatively movable into and out of a position in which said core extends into said mold member, means positioned to become operative, and cooperate with said walls, in the relative movement of said mold and core members toward a position in which said core extends into said mold member, for holding said walls against outward movement under the pressure exerted by the material in the mold during the molding operation, means in the relative movement of said members to strip the receptacle from the core member, and means for continuously regulating the temperature of said last named means.

19. In a machine of the character set forth, the combination of receptacle-forming mold and core members, side-walls of said mold member being movable toward and away from each other and said members being relatively movable into and out of a position in which said core extends into said mold member, means for holding said walls in closed position during the molding operation, means in the relative movement of said members to strip the receptacle from the core member, and means for continuously regulating the temperature of said last named means.

20. In a machine of the character set forth, the combination of receptacle-forming mold and core members, side-walls of said mold member being movable toward and away from each other and said members being relatively movable into and out of a position in which said core extends into said mold member, means for holding said walls in closed position during the molding operation, means operating in the relative movement of said members away from each other to strip the molded receptacle from said core member, and means to continuously regulate the temperature of said stripping means.

21. In a machine of the character set forth, the combination of receptacle-forming mold and core members, side-walls of said mold member being movable toward and away from each other and said members being relatively movable into and out of a position in which said core extends into said mold member, means operating to force said walls toward each other into closed position, means operating in the relative movement of said members away from each other to strip the molded receptacle away from core member, and means to continuously regulate the temperature of said stripping means.

22. In a machine of the character set forth, the combination of receptacle-forming mold and core members relatively movable into and out of a position in which the core extends into said mold member, said mold member being formed of a receptacle-bottom-forming-plate and side walls operatively connected with said plate to rock toward and away from each other, means for holding said side walls in closed condition during the molding of the receptacle, means operating in the relative movement of said members to strip the receptacle from the core, and means continuously regulating the temperature of said stripping means.

MARINO BELLO.